(12) United States Patent
De-Gol

(10) Patent No.: US 6,871,596 B2
(45) Date of Patent: Mar. 29, 2005

(54) MOVING MEANS, PARTICULARLY FOR AMUSEMENT PARKS, FAIRS AND THE LIKE

(75) Inventor: Gino De-Gol, Perton (GB)

(73) Assignees: Kuka Roboter GmbH, Augsburg (DE); Robocoaster Limited, GB-Warwick (GB)

( * ) Notice: Subject to any disclaimer, the term of this patent is extended or adjusted under 35 U.S.C. 154(b) by 0 days.

(21) Appl. No.: 10/352,833

(22) Filed: Jan. 28, 2003

(65) Prior Publication Data
US 2003/0172834 A1 Sep. 18, 2003

(30) Foreign Application Priority Data
Jan. 30, 2002 (DE) .......................... 102 03 729

(51) Int. Cl.[7] .................................. A63G 1/00
(52) U.S. Cl. ........................................ 104/53
(58) Field of Search .................... 104/53, 55, 56, 104/63, 65, 74, 75, 76

(56) References Cited

U.S. PATENT DOCUMENTS

| 3,120,197 A | 2/1964 | Cirami |
| 3,680,487 A | 8/1972 | Cirami |
| 5,199,156 A * | 4/1993 | Rossi ........................... 29/509 |
| 5,453,053 A * | 9/1995 | Danta et al. .................. 472/29 |
| 5,527,221 A * | 6/1996 | Brown et al. ................. 472/31 |
| 5,558,581 A * | 9/1996 | Knijpstra ..................... 472/31 |
| 5,595,121 A | 1/1997 | Elliott et al. |
| 6,302,029 B1 | 10/2001 | Distelrath |
| 6,341,564 B1 | 1/2002 | Ochi |
| 6,620,051 B2 * | 9/2003 | Kroon et al. ................. 472/31 |

FOREIGN PATENT DOCUMENTS

| DE | 441 391 | 3/1927 |
| NL | A 9401636 | 4/1996 |
| WO | PCT/GB01/02537 | 6/2001 |
| WO | WO 01/95989 | 12/2001 |

* cited by examiner

Primary Examiner—S. Joseph Morano
Assistant Examiner—Robert J. McCarry, Jr.
(74) Attorney, Agent, or Firm—McGlew and Tuttle, P.C.

(57) ABSTRACT

The invention relates to a propelling device, particularly for amusement parks, fairs, etc., which has at least one robot provided with a passenger carrier. In order to ensure greater use variability, a propelling device is proposed in which there is a closed movement track for the robot or robots.

36 Claims, 6 Drawing Sheets

MOVING MEANS, PARTICULARLY FOR AMUSEMENT PARKS, FAIRS AND THE LIKE

Figure 1:
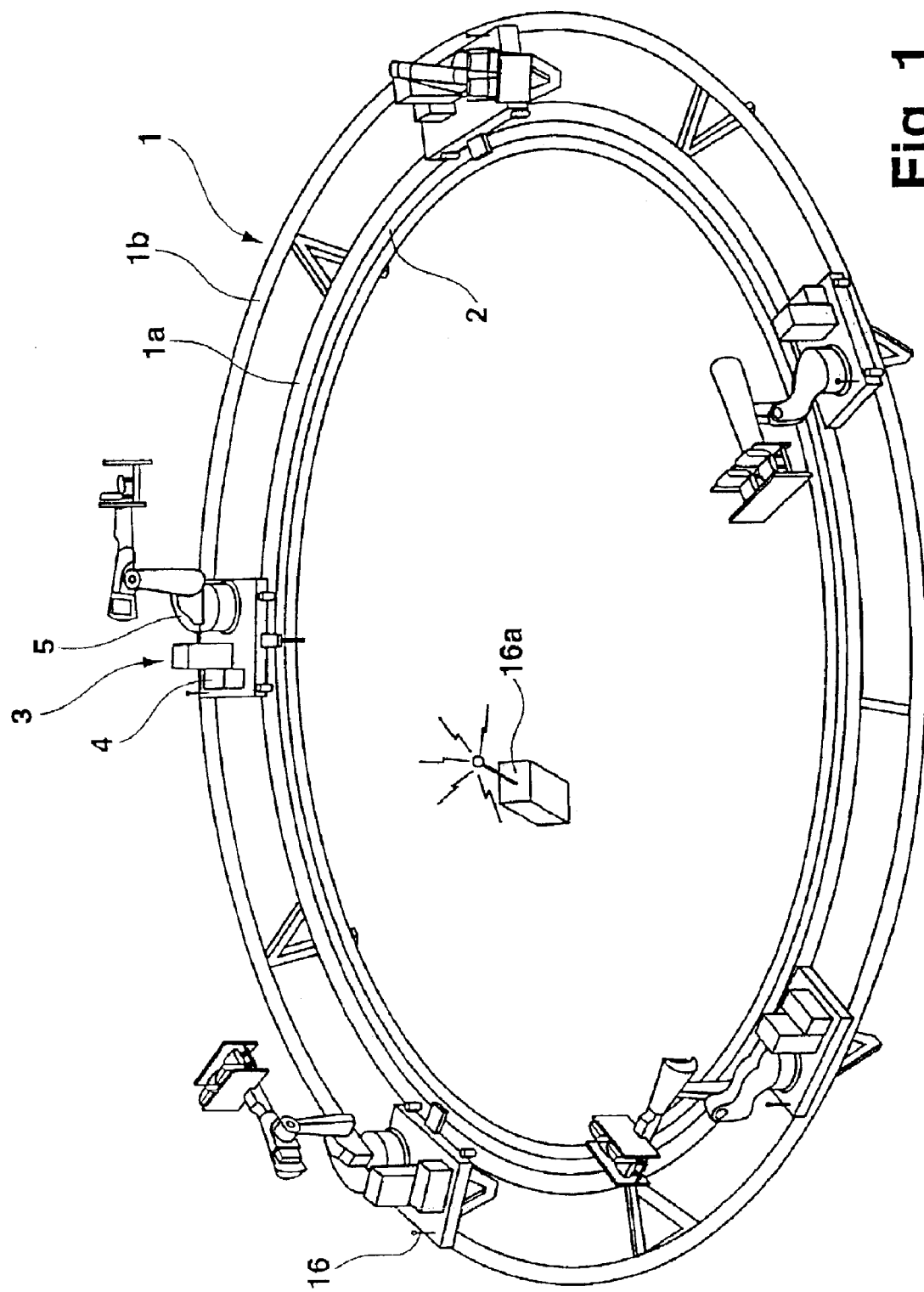

The invention relates to a moving means, particularly for amusement parks, fairs and the like having at least one robot provided with a passenger carrier.

Such a moving means is described in international application PCT/GB01/02537. It comprises a normally stationary multiaxial industrial robot provided on its robot hand with a carrier for passengers and which is preferably constructed in the form of a double seat. Safety and restraining devices in the form of straps are provided, so as to maintain the passengers safely on the seat even e.g. when performing an upside down movement.

According to this prior application it is possible to juxtapose in suitable means and in stationary manner several such robots. In addition, two robots can be arranged in rotary manner on a carrousel, which are positioned in fixed manner on the carrousel carrier and consequently have a fixed relative spacing. In addition, robots can be moved up and down along a column.

However, the movement possibilities, particularly with respect to the relative movements of robots are very restricted. In particular, no independent or asynchronous movements of the robots relative to one another are possible.

The problem of the invention is to increase the variability of the use possibilities for such a propelling means address the needs of effective passanger capacity and increase the pleasure of persons or passengers using it.

According to the invention this problem is solved by a moving or ride means of the aforementioned type, which is characterized by a closed track for the robot or robots.

Therefore one or more robots can be moved on a closed track either synchronously, or more particularly asynchronously or completely independently of one another, provided that the safety clearances between neighbouring robots are respected. It is important that with such movements there is no need at the here, not provided, end points of the track to effect an abrupt stopping for reversing the movement direction, as is disadvantageously the case with finite linear tracks.

In addition, a high mobility and capacity can be achieved compared with the hitherto proposed concepts, so that the use of the inventive propelling means in amusement parks, fairs, etc. becomes more attractive.

The closed track according to the invention can be circular, oval, elliptical or can be provided with concave and convex arcs.

Besides a standing arrangement of the robots, particularly a robot with six inherent moving axis, it is also possible to have a suspended or hanging arrangement or a more or less inclined orientation of the robot base axis with respect to the vertical and in particular a horizontal orientation thereof. It is in particular possible to construct a track in such a way that there can be standing and suspended robots on the same track and optionally it is additionally possible to displace under a finite angle of the axis of the robot with respect to the perpendicular and in particular robots having horizontally oriented bases.

According to a preferred development the track has rails or is formed by the latter. It is possible to have a single rail, which is also advantageous for cost reasons in the case of a suspended construction. However, the track can also be formed by two rails, particularly with a standing arrangement of the movable robot or with a horizontal orientation or some other orientation with respect to the vertically inclined base orientation.

In a particularly preferred development, the power supply takes place in cable-free manner, in order to ensure the independence of the movement possibilities of the robots.

In a preferred manner, alongside the track is provided a power supply rail, which preferably has three phases, in order to ensure a supply with a conventional three-phase current. On the robot or on the carriage or trolley carrying the latter, there are correspondingly three current collectors, which are in particular provided with springs engaging in sliding manner on the phase conductors.

This would allow the robot to circulate freely around the track without the need for the robot controller, position monitoring and servo feedback cables to be fed in a complex manner to the moving robot and carriage, together with all of the attendant problems with entanglement, speed or movement restrictions and fatigue failures. This is achieved by the incorporation of the robot controller being integrated or mounted on the carriage, thus only requiring power from the pick up bars alongside the track. This embodies the unique application of a multiple axis robot mounted onto a moving carriage with unrestriceted movement of the robot arm and carriage.

In another preferred construction, at least one robot is located on a carriage and antennas are provided for receiving the control signals.

On the robot or on a carriage carrying the latter is provided at least one control device, which is preferably formed by a standard personal computer. The additional feature of the robot peripheral interface and communications of the robot controller, such as the control and safety signalling which is either hardware built into the track and/or via wireless communication formats provide a further advantage. This further allows the sequencing and control of the carriage-mounted robot with external devices and inputs, allowing dynamic interaction with each other whilst static at any position or even moving on the track. The nature of the requirements of such a system with regard to the state of the art, is that this configuration of carriage-mounted robot presents a flexible and constantly changing collision hazard and passengers movement dynamics. This is due to the fact that the passengers are transported on a multiple axial platform, usually on a 6 axes extended arm, whilst moving on a roller coaster type track. For example even when the carriage is stopped on the track, the potential and risk of moving significant distances with the robot is still apparent and should be monitored and controlled accordingly by an intrinsically safe and reliable on board control system.

In addition, on the movable part of the propelling means according to the invention, i.e. either on the robot (base) or on a carriage carrying the same can be provided power supply units, particularly in uninterrupted manner and a drive for the propelling movement of the robot, even though in the case of a synchronous robot movement a towing method is fundamentally possible. In a preferred development the power supply unit and drive are combined into a single power unit.

According to another preferred development, more than one robot is provided on a carriage.

In another preferred development the carriage is provided with mechanical buffers extending beyond a movement envelope of the robots in the forward and reverse motion of the carriage to ensure clear and safe working separation of passengers. The robot full articulation range must be taken into account during use, and guarantee mechanically passive-safe separation of carriage units on the common track. The buffers must therefore extend well beyond the carriage itself and follow the curvature of the track both in front and/or behind to provide protection for the entire robot movement range safe clearances for passangers.

This concept could be further enhanced to include an active rather than passive nature. For example the buffers could compress in safe circumstances and interlock checks to allow a higher density of carriages in a load/unload area for example, and extend to full safety protection whilst in the normal operational mode and area of the track.

Furtheron at least one emergency stopping device way be built in to provide an intrinsically safe method of stopping the carriages and/or robots in an emergency or controls failure. This could be fail-safe position detection technology incorporated into each carriage, and monitored by an external sensing means incorporated in the overall system controls and track unit for example.

According a preferred embodiment one robot supports more than two seats, preferably in fform of multiple seats.

Further embodiments provides that it is synchronised with external visual or peripheral devices in synchronisation with the motion of the robot and carriage and/or it is fitted with vibration isolation dampers for the robot controller on the carriage to protect the controls and electronics.

Mounting a robot and it's controller on a roller coaster track is absolutely unique both in terms of recirculating an industrial robot on a track together with it's controller, and the motion and ride dynamics it provides.

Further features and advantages of the invention can be gathered from the claims and the following description of embodiments of the propelling means according to the invention with reference to the attached drawings, wherein show:

FIG. 1 An overall view of a propelling means according to the invention.

Figure 2:
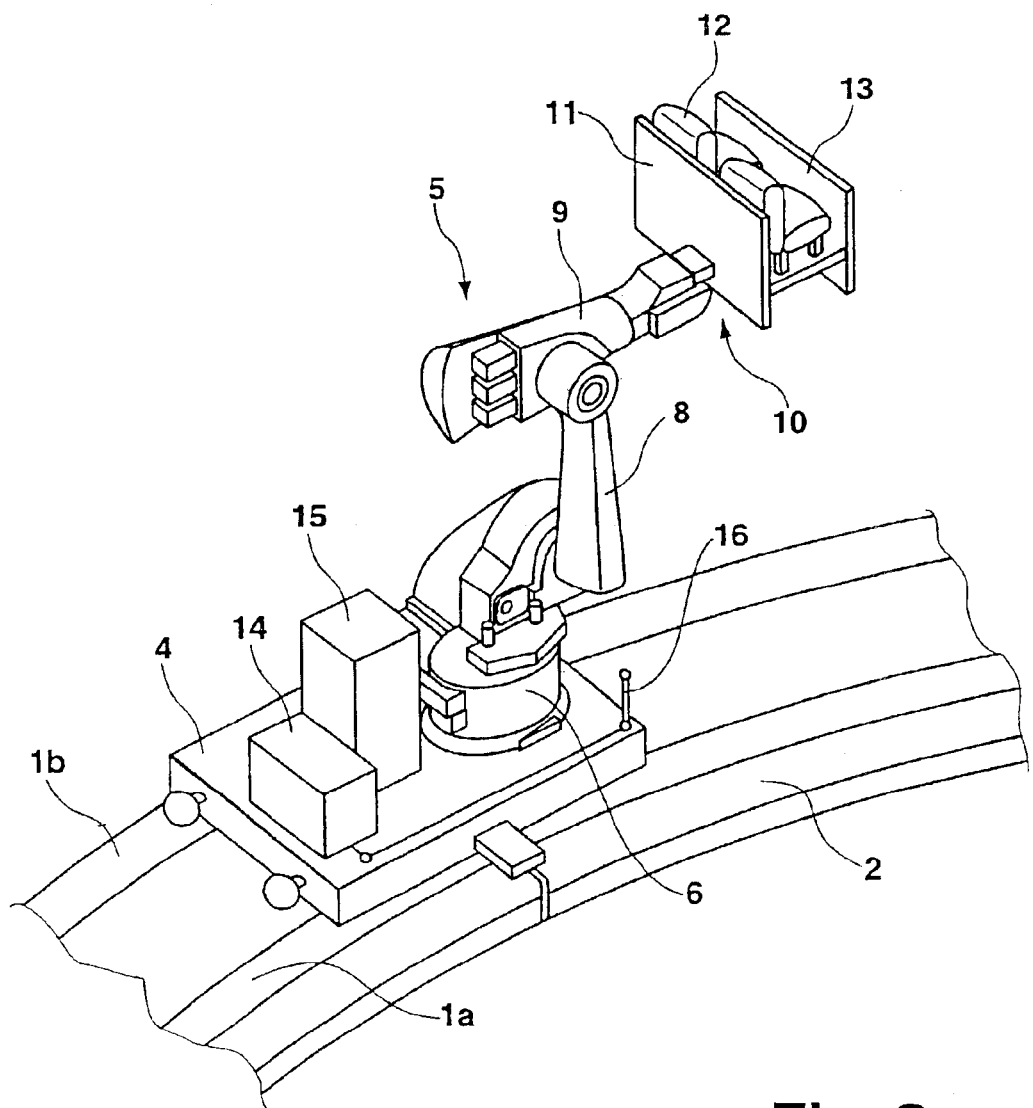

FIG. 2 Details of the propelling means according to the invention.

Figure 3:
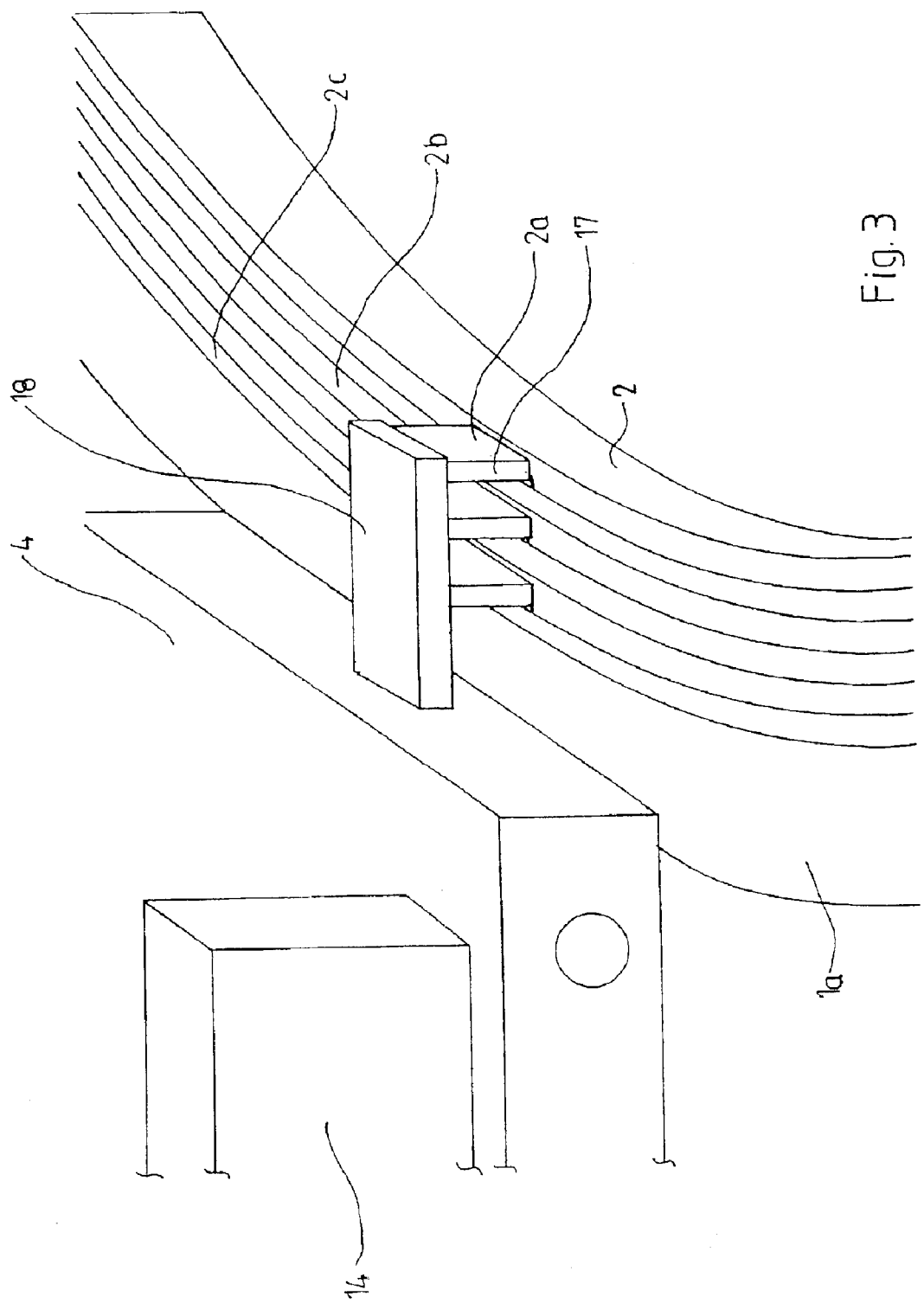

FIG. 3 Further details concerning the power transmission from the stationary to the movable part of the propelling means according to the invention.

Figure 4:
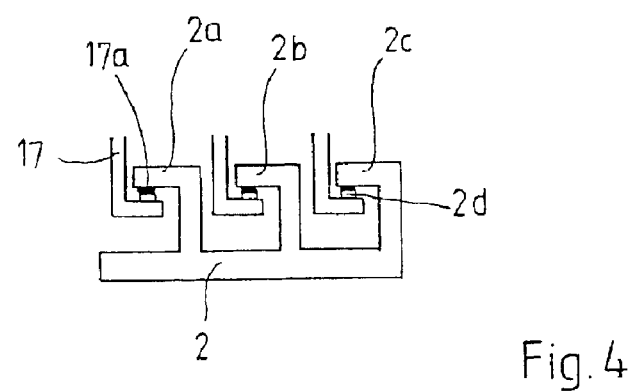

FIG. 4 A section through the power-carrying rail of the propelling means according to the invention.

Figure 5:
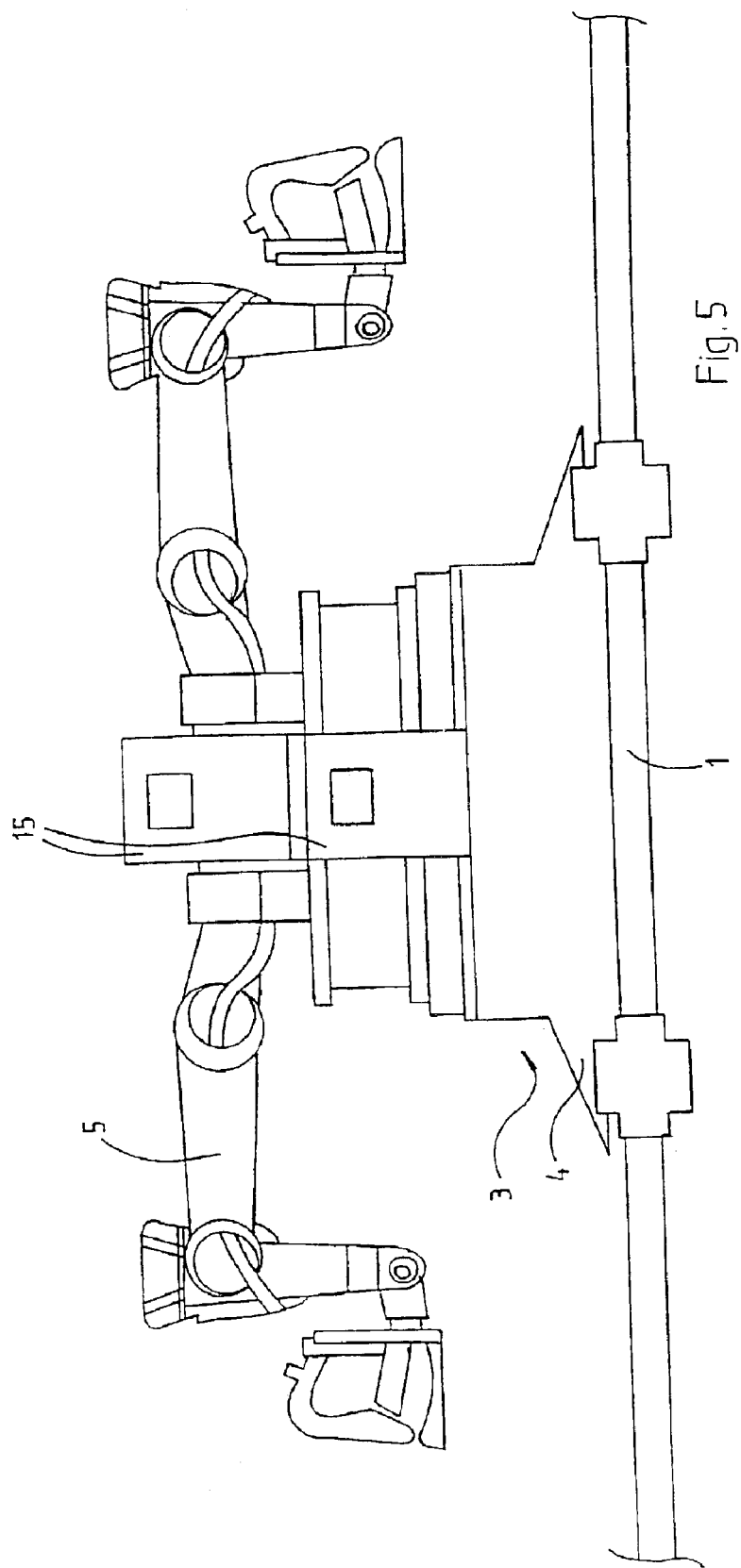

FIG. 5 A view of two robots on a carriage, which is carried by a rail.

Figure 6:
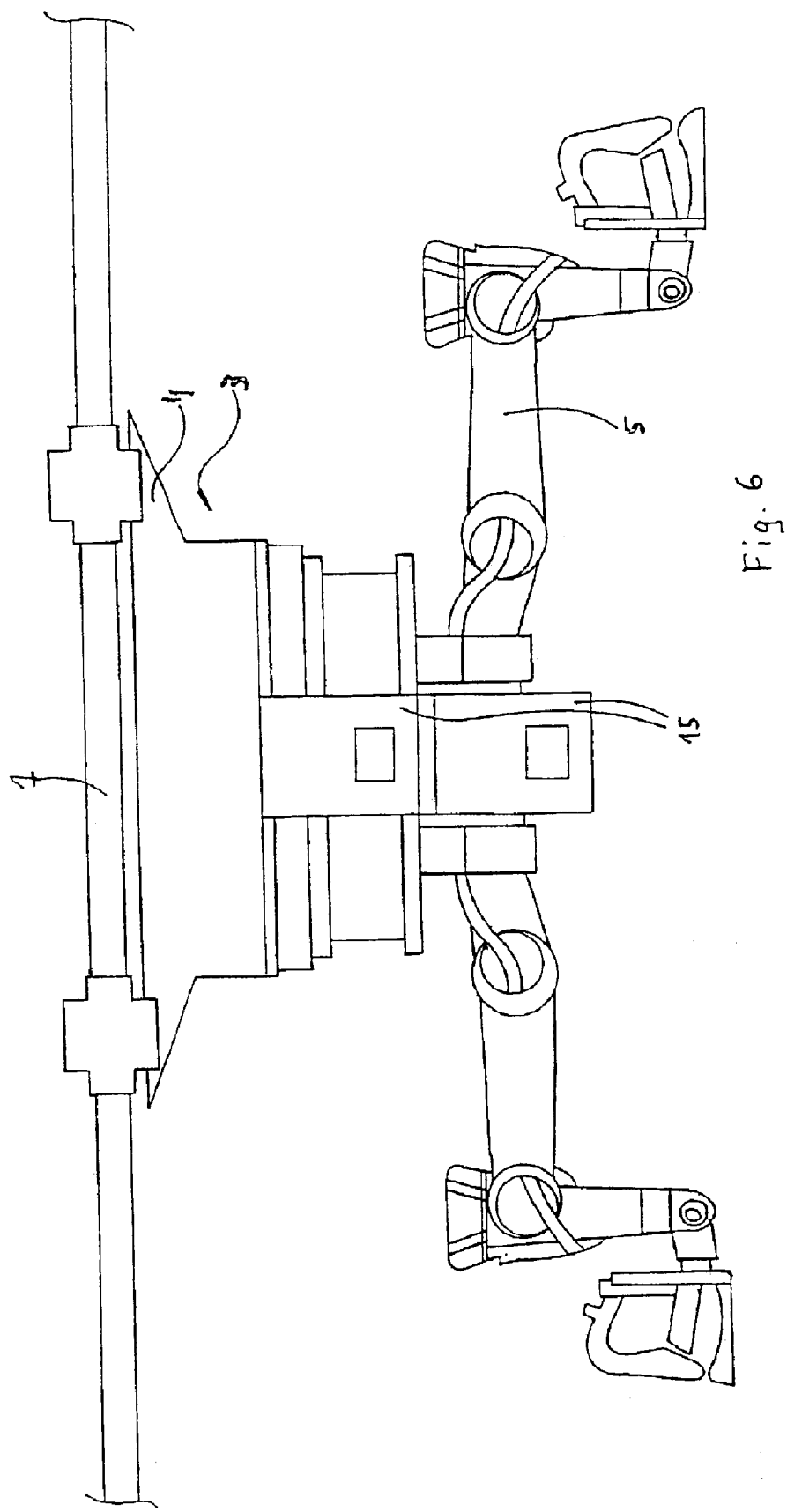

FIG. 6 A view of two robots on a carriage, moved in suspended manner on a rail.

The propelling means according to the invention which is more particularly intended for amusement parks, fairs, etc., i.e. an amusement means, has in the embodiment shown a closed, circular track 1, which is formed by two parallel rails 1a, 1b. There can also be a support rail in the case of double rails. Instead of being circular, the closed track can be oval or elliptical or can have several concave and convex arcs.

Alongside the support rails there is an electric power-carrying rail 2, which is preferably constructed with three contact rails for the three phases of a standard three-phase current.

In the represented embodiment, the movable part 3 of the propelling means according to the invention has a carriage or trolley 4. On said carriage 4 is provided a conventional industrial robot 5 with base 6, carrousel 7, rocker 8, robot arm 9 and robot hand 10. With its robot hand 10 the robot 5 carries a passenger carrier 11 with in the represented embodiment two seats 12 and corresponding safety retention devices 13 for the passengers carried.

On the carriage 4 there is a power part with a drive for the displacement of the carriage 4 and an uninterrupted power supply, which can in particular be equipped with an electric battery. On the carriage 4 is provided a control device 15, such as a robot control device, preferably in the form of a conventional personal computer. The carriage 4 also carries an antenna 16 for the cable-free transmission of control signals from a central transmission means 16a.

The power-carrying rail 2 comprises three individual rail tracks 2a, 2b, 2c (FIGS. 3 and 4), which are constructed as angle tracks. On the underside of their horizontal side they are in each case provided with electricity-conducting tracks 2d. Between the individual rail tracks 2a, 2b, 2c acts a current collector 17 connected by means of a lug 18 to the carriage 4. The current collector 17 also has an angular construction and is provided on the top of its horizontal side engaging under the horizontal side of the rails 2a, 2b, 2c with a power collecting spring 17a, which resiliently engages against the power-carrying tracks 2d of the power-carrying rail 2.

Thus, from said tracks it is possible to take the electric power for the moveable part of the propelling means according to the invention. Whereas in the hitherto described embodiment the carriage 4 only carries one robot 5, FIG. 5 shows a construction with two robots 5 for a carriage 4. There are also two robot control devices 14 and 15. Not shown, but present is a drive for the carriage 4 and also for an uninterrupted power supply. The carriage 4 is carried by the rails 1 in the construction according to FIG. 5.

It is alternatively possible for a carriage 4 with one or more and in particular two robots to be moved in suspended manner on rails 1, as shown in FIG. 6.

LIST OF REFERENCE NUMERALS

1 Track
1a/1b Parallel rail
2 Power-carrying rail
2a/2b/2c Rail track
2d Electrically conductive track
3 Movable part
4 Carriage
5 Robot
6 Base
7 Carrousel
8 Rocker
9 Robot arm
10 Robot hand
11 Passenger carrier
12 Seats
13 Safety retaining device
14 Control device
15 Control device
16 Antenna
16a Transmission means
17 Current collector
17a Power collecting spring
18 Lug

What is claimed is:

1. A propelling apparatus for amusement parks, and fairs, comprising:
    at least one multiaxial industrial robot further comprising:
    a carrousel moveable about a first axis;
    a first elongated member moveably connected to said carrousel along a second axis;
    a second elongated member moveably connected to said first elongated member along a third axis;
    a passenger carrier connected to said second elongated member; wherein said first axis, said second axis and said third axis allow three translational movements and three rotational movements wherein said multiaxial industrial robot runs on a closed track for said robot.

2. The propelling apparatus according to claim 1, wherein said track is circular.

3. The propelling apparatus according to claim 1, wherein said track is oval.

4. The propelling apparatus according to claim 1, wherein said track is elliptical.

5. The propelling apparatus according to claim 1, wherein said track has concave and convex arcs.

6. The propelling apparatus according to claim 1, wherein said robot or robots are movable in standing manner on said track.

7. The propelling apparatus according to claim 1, wherein said robots are arranged in such a way that their base axis (A1 axis) is inclined with respect to said track.

8. The propelling apparatus according to claim 1, wherein more than one robot can be displaced on said track.

9. The propelling apparatus according to claim 8, wherein several robots can be synchronously displaced on said track.

10. The propelling apparatus according to claim 8, wherein several robots are displaceable on said track independently of one another, whilst ensuring relative safety clearances between the individual robots.

11. The propelling apparatus according claim 1, wherein said track is formed by rails.

12. The propelling apparatus according to claim 11, wherein said robots are in each case held by a single track.

13. The propelling apparatus according to claim 11, wherein said robots are in each case held by two parallel single tracks.

14. The propelling apparatus according to claim 1, wherein there is a cable-free power supply of said robots.

15. The propelling apparatus according to claim 14, wherein a power-carrying rail runs alongside said track.

16. The propelling apparatus according to claim 15, wherein said rail has three phase conductors.

17. The propelling apparatus according to claim 15, wherein said robot includes contact springs for contacting the power-carrying conductors of said power-carrying rails.

18. The propelling apparatus according to claim 1, wherein there is at least one robot on a carriage.

19. The propelling apparatus according to claim 18, wherein said robot or said carriage is connected to an antenna for control signal transmission.

20. The propelling apparatus according to claim 18, wherein said carriage carries a control device.

21. The propelling apparatus according to claim 20, wherein said control device is constituted by a conventional personal computer.

22. The propelling apparatus according to claim 18, wherein said carriage carries an uninterrupted power supply unit.

23. The propelling apparatus according to claim 22, further comprising a drive for moving said carriage.

24. The propelling apparatus according to claim 22, wherein said uninterrupted power supply unit and said drive are combined into a single power unit.

25. The propelling apparatus according to claim 1, further comprising at least two robots on a carriage.

26. The propelling apparatus according to claim 18, wherein said carriage is provided with mechanical buffers extending beyond a movement envelope of said robots in a forward and reverse motion of said carriage to ensure clear and safe working separation of passengers.

27. The propelling apparatus according to claim 1, further comprising at least one emergency stopping device built into provide an intrinsically safe method of stopping the carriages and/or robots in an emergency or controls failure.

28. The propelling apparatus according to claim 1, wherein one robot supports more than two seats.

29. The propelling apparatus according to claim 1, wherein external visual or peripheral devices are in synchronisation with a motion of said robot and carrier.

30. The propelling apparatus according to claim 1, further comprising vibration isolation dampers for said robot controller on said carriage to protect said controls and electronics.

31. The propelling apparatus according to claim 19, wherein said antenna is adapted for wireless communication of control signals with a central transmission device.

32. The propelling apparatus according to claim 1, wherein one or several robots are moveable in suspended manner on said track.

33. An amusement apparatus, said apparatus comprising:
a closed track of a defined shape with a rail means;
a base with engaging means for engaging said rail means;
a first arm connected to said base by a first axis for rotatably moving said first arm about said first axis;
a second arm connected to said first arm by a second axis for rotatably moving said second arm about said second axis;
a passenger carrying means for carrying passengers located on a distal end of said second arm, wherein said first axis and said second axis allow three translation movements and three rotation movements.

34. The amusement apparatus according to claim 33, wherein said base rotates along a third axis.

35. The amusement apparatus according to claim 34, wherein said distal end of said second arm rotates along a fourth axis.

36. The amusement apparatus according to claim 33, wherein said passenger carrying means move independently of another passenger carrying means.

* * * * *